(12) United States Patent
Xi et al.

(10) Patent No.: US 10,207,256 B2
(45) Date of Patent: Feb. 19, 2019

(54) PHOTOCATALYTIC CONCRETE MATERIAL SPRAYED WITH TITANIUM DIOXIDE/ACTIVATED ZEOLITE COMPOSITE MATERIAL AND PREPARATION METHOD THEREOF

(71) Applicant: YANCHENG INSTITUTE OF TECHNOLOGY, Yancheng (CN)

(72) Inventors: Xinguo Xi, Yancheng (CN); Pengyu Dong, Yancheng (CN); Xing Cai, Yancheng (CN); Hao Tian, Yancheng (CN)

(73) Assignee: YANCHENG INSTITUTE OF TECHNOLOGY, Yancheng (CN)

( * ) Notice: Subject to any disclaimer, the term of this patent is extended or adjusted under 35 U.S.C. 154(b) by 30 days.

(21) Appl. No.: 15/405,308

(22) Filed: Jan. 13, 2017

(65) Prior Publication Data
US 2017/0209856 A1    Jul. 27, 2017

(30) Foreign Application Priority Data
Jan. 21, 2016 (CN) .......................... 2016 1 0045654

(51) Int. Cl.
| | | |
|---|---|---|
| B01J 29/06 | (2006.01) | |
| B01J 21/06 | (2006.01) | |
| B01J 21/08 | (2006.01) | |
| B01J 35/00 | (2006.01) | |
| B01J 37/04 | (2006.01) | |
| B01J 37/06 | (2006.01) | |
| B01J 37/08 | (2006.01) | |
| C04B 14/06 | (2006.01) | |
| B01J 37/02 | (2006.01) | |
| C04B 28/02 | (2006.01) | |
| C04B 18/02 | (2006.01) | |
| C04B 111/00 | (2006.01) | |
| B01J 37/34 | (2006.01) | |

(52) U.S. Cl.
CPC .......... *B01J 29/061* (2013.01); *B01J 21/063* (2013.01); *B01J 21/08* (2013.01); *B01J 35/004* (2013.01); *B01J 35/0006* (2013.01); *B01J 37/0219* (2013.01); *B01J 37/0232* (2013.01); *B01J 37/0246* (2013.01); *B01J 37/04* (2013.01); *B01J 37/06* (2013.01); *B01J 37/08* (2013.01); *C04B 14/06* (2013.01); *C04B 18/021* (2013.01); *C04B 28/02* (2013.01); B01J 37/086 (2013.01); B01J 37/343 (2013.01); B01J 2229/18 (2013.01); C04B 2111/00146 (2013.01); C04B 2111/00827 (2013.01)

(58) Field of Classification Search
None
See application file for complete search history.

(56) References Cited

U.S. PATENT DOCUMENTS

| | | | | |
|---|---|---|---|---|
| 6,454,489 | B1 * | 9/2002 | Murata | ................. C04B 14/305 404/17 |
| 6,455,615 | B2 * | 9/2002 | Yu | .......................... C04B 28/02 264/175 |
| 6,699,577 | B2 * | 3/2004 | Nonoyama | ........ B01D 53/8637 428/323 |

FOREIGN PATENT DOCUMENTS

| | | | |
|---|---|---|---|
| CN | 102584139 A | * | 7/2012 |
| JP | 2011031130 A | * | 2/2011 |

OTHER PUBLICATIONS

Kong et al, The influence of silanes on hydration and strength development of cementitious systems, cement and concrete research, 67, pp. 168-178 (Year: 2015).*
Lookchem (Year: 2014).*
Cn102584139—english translation (Year: 2012).*
Maeng et al, effects of chelating agents on stability of nano-tio2 sol particles for sol gel coating, j nanosci nanotechnol, nov. 2015, abstract (Year: 2015).*
Huang et al, photocatalytic discolorization of methyl orange solution by pt modified tio2 loaded on natural zeolite, dyes and pigments, vol. 77, issue 2, pp. 327-334 (Year: 2008).*
English translation of JP2011031130A (Year: 2011).*
https://www.lookchem.com/OP-10/ (Year: 2008).*

* cited by examiner

Primary Examiner — Melvin C. Mayes
Assistant Examiner — Stefanie J Cohen
(74) Attorney, Agent, or Firm — Wayne & Ken, LLC; Tony Hom

(57) ABSTRACT

The present invention provides a photocatalytic concrete material sprayed with titanium dioxide/activated zeolite composite material and preparation method thereof, and the photocatalytic concrete material sprayed with titanium dioxide/activated zeolite composite material comprises following raw materials in parts by weight titanium dioxide 0.1-20 parts, activated zeolite molecular sieve 0.1-20 parts, dispersant 0.1-5 parts, emulsifier 0.05-2 parts, coupling agent 0.05-2 parts, cement 40-90 parts, fine sand 40-90 parts and water. In the present invention, the activated zeolite molecular sieve can load titanium dioxide photocatalytic material as a carrier, and can easily adsorb gaseous pollutant of automobile exhaust with huge specific surface area (280.1 m$^2$/g), thereby increasing photocatalytic degradation efficiency and the efficiency can reach 92%, besides, the present invention has advantages of simple preparation technology, cheap raw materials and low preparation cost, so the present invention is suitable for industrial production.

6 Claims, No Drawings

PHOTOCATALYTIC CONCRETE MATERIAL SPRAYED WITH TITANIUM DIOXIDE/ACTIVATED ZEOLITE COMPOSITE MATERIAL AND PREPARATION METHOD THEREOF

CROSS-REFERENCE TO RELATED APPLICATIONS

This application claims priority of Chinese Patent Application No. 201610045654.5 with a filing date of Jan. 21, 2016. The content of the aforementioned application, including any intervening amendments thereto, are incorporated herein by reference.

TECHNICAL FIELD

The present invention relates to engineering material field, and more specifically, to a photocatalytic concrete material sprayed with titanium dioxide/activated zeolite composite material and preparation method thereof.

BACKGROUND OF THE INVENTION

As the most widely used engineering material at present, concrete plays a role in various fields. Experts of various countries in the world prepare various concretes with unique properties and more application fields by study for exploiting various excellent properties of concretes and satisfying needs of construction and building materials.

With rapid development of industrialization and urbanization, environmental pollution problems have become urgent problem to affect human health and national development. Photocatalytic technique, as a new and environmental protection technology, can degrade some pollutants. In preparation of photocatalytic material, nano titanium dioxide photocatalytic material gained popularity due to characteristics of low cost, stable chemical property, no toxicity and no harm, energy conservation and environment protection and mature preparation technology. Photocatalytic concrete is an efficient way to solve air pollution, and has certain degradation effect on main air pollutants such as nitric oxide and sulfide of automobile exhaust and industrial exhaust.

At present, no companies and enterprises in China have applied photocatalytic concrete successfully. It is still in the research and development stage. However, many experts and scholars in China and abroad have already made some progress in photocatalytic concrete research and development. However, some problems such as low degradation efficiency, poor wear resistance performance, short service cycle and high application cost are existed.

1. Automobile exhausts are assembled on the road surface, however, they are difficult to be adsorbed by common titanium dioxide photocatalytic material, that is, the automobile exhausts cannot be further degraded, resulting in low efficiency of photocatalyst. If materials with good adsorbing effect are added, such as activated zeolite, the automobile exhausts on the road surface can be adsorbed, thereby increasing photocatalytic degradation efficiency of titanium dioxide.

2. Rubber powder and coal ash are used in Chinese patent CN200910185024.8 and CN201110083342.0 respectively as photocatalyst carrier, which realizes waste utilization and has many good performances. However, in industrial production, preparation of rubber powder and screening of coal ash are of big equipment investment and high production cost, so they are difficult to be applied in large scale.

SUMMARY OF THE INVENTION

For above deficiencies existing in the prior art, the present invention provides a photocatalytic concrete material sprayed with titanium dioxide/activated zeolite composite material and preparation method thereof. The present invention loads titanium dioxide on the activated zeolite molecular sieve, sprays mixed sizing agent on the concrete surface, adsorbs pollutants by utilizing good adsorption ability of activated zeolite, and utilizes photocatalysis property of the photocatalytic concrete to degrade pollutants thereon, which increases efficiency of degrading pollutants of photocatalytic concrete and reducing the cost in industrial process.

The technical scheme of the invention is as follows: a photocatalytic concrete material sprayed with titanium dioxide/activated zeolite composite material, comprising following raw materials in parts by weight: titanium dioxide 0.1-20 parts, zeolite molecular sieve 0.1-20 parts, dispersant 0.1-5 parts, emulsifier 0.05-2 parts, coupling agent 0.05-2 part, cement 40-90 parts, fine sand 40-90 parts and water.

Preferably, the photocatalytic concrete material comprises following raw materials in parts by weight: titanium dioxide 0.5-15 parts, zeolite molecular sieve 0.5-15 parts, dispersant 0.1-5 parts, emulsifier 0.05-1 parts, coupling agent 0.05-1 parts, cement 40-90 parts, fine sand 40-90 parts and water.

In the photocatalytic concrete material, the titanium dioxide is prepared by tetrabutyl titanate, anhydrous ethanol, acetic acid and nitric acid.

The dispersant is sodium dodecyl benzene sulfonate, the emulsifier is OP-10 and the coupling agent is silane coupling agent KH-550.

The present invention also provides a preparation method of photocatalytic concrete material sprayed with titanium dioxide/activated zeolite composite material, comprising following steps:

Step 1: preparing a natural zeolite molecular sieve into an activated zeolite molecular sieve;

Step 2: preparing the activated zeolite molecular sieve, tetrabutyl titanate, anhydrous ethanol, acetic acid, and nitric acid into a titanium dioxide/activated zeolite composite material;

Step 3: preparing a photocatalytic sizing agent through the titanium dioxide/activated zeolite composite material; and Step 4: preparing a photocatalytic concrete material through the photocatalytic sizing agent.

In above preparation method, the step 1 of preparing the natural zeolite molecular sieve into the activated zeolite molecular sieve comprises: washing the natural zeolite molecular sieve with distilled water, placing the washed natural zeolite molecular sieve into an oven and drying, and the oven temperature is 70-90 DEG C., placing the dried natural zeolite molecular sieve into a high temperature furnace and calcining, and obtaining the activated zeolite molecular sieve after activating.

The step 2 of preparing the activated zeolite molecular sieve and titanium dioxide into the titanium dioxide/activated zeolite composite material comprises:

dissolving the tetrabutyl titanate into the anhydrous ethanol, stirring and forming a first mixture;

adding the activated zeolite molecular sieve slowly into the first mixture, mixing evenly and obtaining a second mixture;

adding the acetic acid and the nitric acid into the second mixture slowly and obtaining a sol;

drying, calcining, grinding the sol and obtaining the titanium dioxide/activated zeolite composite material.

The step 3 of preparing the photocatalytic sizing agent through the titanium dioxide/activated zeolite composite material comprises:

dispersing the titanium dioxide/activated zeolite composite material into water, adding the dispersant sodium dodecyl benzene sulfonate, the emulsifier OR-10, the silane coupling agent KH-550, cement and fine sand, stirring evenly and obtaining the photocatalytic sizing agent.

The step 4 of preparing the photocatalytic concrete material through the photocatalytic sizing agent comprises:

spraying the prepared photocatalytic sizing agent on surface of a concrete block, drying in the air naturally and obtaining the photocatalytic concrete material.

In production process of the concrete block, the water cement ratio is 0.375, and curing age is 3 days, and spraying the prepared photocatalytic sizing agent on surface of a concrete block for 10 layers, drying in the air naturally and obtaining the photocatalytic concrete material.

The invention provides a photocatalytic concrete material sprayed with titanium dioxide/activated zeolite composite material and preparation method thereof, and the photocatalytic concrete material sprayed with titanium dioxide/activated zeolite composite material comprises following raw materials in parts by weight: titanium dioxide 0.1-20 parts, activated zeolite molecular sieve 0.1-20 parts, dispersant 0.1-5 parts, emulsifier 0.05-2 parts, coupling agent 0.05-2 parts, cement 40-90 parts, fine sand 40-90 parts and water. In the present invention, the activated zeolite molecular sieve can load titanium dioxide photocatalytic material as a carrier, and can easily adsorb gaseous pollutant of automobile exhaust with huge specific surface area (280.1 $m^2/g$), thereby increasing photocatalytic degradation efficiency and the efficiency can reach 92%, besides, the present invention has advantages of simple preparation technology, cheap raw materials and low preparation cost, so the present invention is suitable for industrial production.

DETAILED DESCRIPTION OF THE INVENTION

The details are described as follows for complete understanding of the invention. However, it is obvious for those skilled in the art that the invention can be carried out without some details. In other examples, for avoiding confusion with the invention, some well-known technical features in the art are not described herein.

Detailed steps and structures will be explained as follows for complete understanding of the invention and better clarification of the technical scheme. Some preferred embodiments of the invention are explained in detail as follows, however, the invention can have other embodiments.

The present invention provides a photocatalytic concrete material sprayed with titanium dioxide/activated zeolite composite material, comprising following raw materials in parts by weight: titanium dioxide 0.1-20 parts, zeolite molecular sieve 0.1-20 parts, dispersant 0.1-5 parts, emulsifier 0.05-2 parts, coupling agent 0.05-2 parts, cement 40-90 parts, fine sand 40-90 parts and water.

In one preferred embodiment of the invention, the photocatalytic concrete material comprises following raw materials in parts by weight: titanium dioxide 0.5-15 parts, zeolite molecular sieve 0.5-15 parts, dispersant 0.1-5 parts, emulsifier 0.05-1 parts, coupling agent 0.05-1 parts, cement 40-90 parts, fine sand 40-90 parts and water.

In one preferred embodiment of the invention, the titanium dioxide is prepared by tetrabutyl titanate, anhydrous ethanol, acetic acid and nitric acid, and the steps are as follows: dissolving the tetrabutyl titanate into the anhydrous ethanol, mixing, stirring and forming a solution, adjusting pH value by acetic acid and nitric acid solution, and preparing into the titanium dioxide.

In one preferred embodiment of the invention, the dispersant is sodium dodecyl benzene sulfonate, the emulsifier is OP-10, and the coupling agent is silane coupling agent KH-550.

In the present invention, the activated zeolite molecular sieve can load titanium dioxide photocatalytic material as a carrier, and can easily adsorb gaseous pollutant of automobile exhaust with huge specific surface area (280.1 $m^2/g$), thereby increasing photocatalytic degradation efficiency and the efficiency can reach 92%.

The present invention also provides a preparation method of photocatalytic concrete material sprayed with titanium dioxide/activated zeolite composite material, comprising following steps:

Step 1: carrying out activated treatment on the natural zeolite molecular sieve and obtaining the activated zeolite molecular sieve, more specifically, washing the natural zeolite molecular sieve with distilled water, placing the washed natural zeolite molecular sieve into an oven and drying, and the oven temperature is 70-90 DEG C., placing the dried natural zeolite molecular sieve into a high temperature furnace and calcining, and obtaining the activated zeolite molecular sieve.

Step 2: preparing the raw materials such as activated zeolite molecular sieve, tetrabutyl titanate, anhydrous ethanol, acetic acid and nitric acid into the titanium dioxide/activated zeolite composite material, and more specifically, step 2a: dissolving the tetrabutyl titanate into anhydrous ethanol, stirring and forming a first mixture, and more specifically, dissolving 6 ml tetrabutyl titanate into 24 ml anhydrous ethanol, mixing, stirring and forming a solution; step 2b: adding the activated zeolite molecular sieve slowly into the first mixture, mixing evenly and obtaining a second mixture, adding the activated zeolite molecular sieve slowly into above mixed solution according to different mass ratio (1:1-1:10) under magnetic stirring, stirring for 10 min and performing ultrasound for 20 min; step 2c: adding acetic acid and nitric acid into the second mixture and obtaining a sol, and more specifically, after the second mixture is mixed evenly, dropwise adding certain amount of acetic acid and nitric acid under magnetic stirring, stirring for 8-12 min, adjusting pH value into 2-5, continually stirring the solution for 1-2 h, ageing for 10-90 min in a sealed condition and obtaining the sol; and step 2d: drying above sol in the oven under 90 DEG C., calcining in box-type furnace under 450-550 DEG C., grinding and obtaining the titanium dioxide/activated zeolite composite material.

Step 3: the step of preparing photocatalytic sizing agent through above titanium dioxide/activated zeolite composite material comprises:

Step 3a: dispersing titanium dioxide/activated zeolite composite material in water, and more specifically, weighing a certain amount of prepared titanium dioxide/activated zeolite composite material powder, pouring the powder slowly into a beaker, adding distilled water, and stirring with glass rod immediately: and step 3b: adding dispersant, emulsifier and coupling agent into suspension liquid of above titanium dioxide/activated zeolite composite material, stirring and obtaining the photocatalytic sizing agent, and more specifically, adding different additives (sodium dodecyl benzene sulfonate, emulsifier OP-10 and silane coupling agent KH-550), stirring and obtaining the photocatalytic sizing agent.

Step 4: the step of preparing the photocatalytic concrete material through the photocatalytic sizing agent comprises: spraying the prepared photocatalytic sizing agent on surface of a concrete block, drying in the air naturally and obtaining the photocatalytic concrete material, and more specifically, spraying the dispersed suspension slurry according to different layers (1-10 layer) evenly on surface of the concrete block by utilizing Fujiwara electric airless sprayer, and drying in the air naturally.

In the present invention, additives, spraying layers, water cement ratio and curing age are compared.

The present invention is further explained by some embodiments.

Embodiment 1:

A preparation method of photocatalytic concrete material sprayed with titanium dioxide/activated zeolite composite material (mass ratio is 1:0.5), comprising following steps:

Carrying out activated treatment on a natural zeolite molecular sieve and obtaining an activated zeolite molecular sieve;

washing the natural zeolite molecular sieve with distilled water, placing the washed natural zeolite molecular sieve into an oven and drying, and the oven temperature is 80 DEG C., placing the dried natural zeolite molecular sieve into a high temperature furnace and calcining for 2 h, and obtaining the activated zeolite molecular sieve.

Preparation of Titanium Dioxide/Activated Zeolite Composite Material;

dissolving 6 ml tetrabutyl titanate into 24 ml anhydrous ethanol, mixing, stirring and forming solution, pouring the activated zeolite molecular sieve (5 A) slowly into above mixed solution according to mass ratio of 1:0.5 in magnetic stirring process, stirring for 10 min and performing ultrasound for 20 min. After the solution is mixed evenly, dropwise adding 2 ml acetic acid and 1 ml nitric acid under magnetic stirring, stirring for 10 min, adjusting pH value to 3, continually stirring the solution for 1 h. aging for 24 h in a sealed condition and obtaining the sol, drying for 12 h in oven under 90 DEG C., placing into a batch-type oven and calcining for 2 h under 500 DEG C., grinding and obtaining the activated zeolite molecular sieve loaded titanium dioxide photocatalytic material with mass ratio of 1:0.5.

(3) Preparation of photocatalytic sizing agent by above titanium dioxide/activated zeolite composite material;

weighing 5.0000 g prepared titanium dioxide/activated zeolite material powder, pouring the powder slowly into 250 ml beaker, adding 50 ml distilled water, and stirring for 5 min with glass rod immediately, adding 0.2066 g dispersant sodium dodecyl benzene sulfonate, stirring for 10 min, preparing into photocatalytic sizing agent and obtaining stable suspension slurry, and after a long time, no slurry sedimentation is found.

(4) Preparation of photocatalytic concrete material by above photocatalytic sizing agent;

weighing 300 g tap water, adding the tap water into an agitated kettle, adding 800 g C30 cement and 900 g fine sand into the kettle slowly, fixing the kettle on the fixed rack immediately, rising the kettle to the fixed position rapidly, fixing the fixed rack, opening the machine power of the agitated kettle rapidly, shifting to low gear, utilizing stopwatch to start timing, stirring for 30 s at low gear; when the time reaches 30 s, adding the pre-weighed standard sand into the kettle slowly; when the time reaches 60 s, shifting the machine to high gear, and stirring for 30 s; when the time reaches 90 s, stop stirring, scraping the raw materials on kettle wall by spatula into the center and scraping the raw materials on the spatula; when the time reaches 180 s, continually stirring for 60 s at high gear, then closing the machine, placing the stirred mortar into mold at twice, and striking.

Placing the truncated cone round mold on the vibrator and fixing, starting the vibrator, taking the mold down, striking the mortar surface with spatula again, and placing the mold in dry and ventilated place. After one day, removing the mold, taking the concrete block out carefully from the mold, placing the mold into standard curing box for cement, and curing age is 3 days.

Finally, spraying the dispersed suspension slurry evenly on surface of the concrete block by utilizing Fujiwara electric airless sprayer, drying in the air naturally and obtaining the photocatalytic concrete material.

Embodiment 2:

The difference with embodiment 1 is that the ratio between titanium dioxide and activated zeolite is 1:1, and other steps are the same.

Embodiment 3:

The difference with embodiment 1 is that the ratio between titanium dioxide and activated zeolite is 1:5, and other steps are the same.

Embodiment 4:

The difference with embodiment 1 is that the ratio between titanium dioxide and activated zeolite is 1:10, and other steps are the same.

Embodiment 5:

The difference with embodiment 4 is that 0.15 g emulsifier OP-10 is added in the sizing agent, and other steps are the same.

Embodiment 6:

The difference with embodiment 4 is that 0.1 g silane coupling agent KH-550 is added in the sizing agent, and other steps are the same.

Embodiment 7:

The difference with embodiment 4 is that 0.2066 g sodium dodecyl benzene sulfonate, 0.15 g emulsifier OP-10 and 0.1 g silane coupling agent. KH-550 are added in the sizing agent, and other steps are the same.

Embodiment 8:

The difference with embodiment 4 is that 0.2066 g sodium dodecyl benzene sulfonate and 0.15 g emulsifier OP-10 are added in the sizing agent, and other steps are the same.

Embodiment 9:

The difference with embodiment 4 is that 0.2066 g sodium dodecyl benzene sulfonate and 0.1 g silane coupling agent KH-550 are added in the sizing agent, and other steps are the same.

Embodiment 10:

The difference with embodiment 4 is that 0.15 g emulsifier OP-10 and 0.1 g silane coupling agent KH-550 are added in the sizing agent, and other steps are the same.

Embodiment 11:

The difference with embodiment 8 is that there are 5 spraying layers, and other steps are the same.

Embodiment 12:

The difference with embodiment 8 is that there are 10 spraying layers, and other steps are the same.

Embodiment 13:

The difference with embodiment 12 is that the water cement ratio is 0.4375, and other steps are the same.

Embodiment 14:

The difference with embodiment 12 is that the curing age is 28 days, and other steps are the same.

The photocatalytic degradation effects of different embodiments in the present invention are given as follows, as shown in Table One.

TABLE ONE

| Embodiment | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Degradation ratio (%) | 35 | 42 | 49 | 56 | 60 | 57 | 68 | 74 | 62 | 65 | 81 | 92 | 83 | 86 |

As can be seen from Table One and embodiments, in manufacturing process of concrete, the water cement ratio is 0.375, the curing age is 3 days, the dispersant in the sizing agent is sodium dodecyl benzene sultanate (0.2066 g) and emulsifier OP-10 (0.15 g), and when the sizing agent is sprayed on surface of the concrete for 10 layers, the photocatalytic degradation effect is the best, and the photocatalytic degradation rate can reach 92%, as shown in Table One.

In conclusion, the present invention provides a photocatalytic concrete material sprayed with titanium dioxide/activated zeolite composite material and preparation method thereof, and the photocatalytic concrete material comprises following raw materials in parts by weight: titanium dioxide 0.1-20 parts, activated zeolite molecular sieve 0.1-20 parts, dispersant 0.1-5 parts, emulsifier 0.05-2 parts, coupling agent 0.05-2 parts, cement 40-90 parts, fine sand 40-90 parts and water. In the present invention, the activated zeolite molecular sieve can load titanium dioxide photocatalytic material as a carrier, and can easily adsorb gaseous pollutant of automobile exhaust with huge specific surface area (280.1 m$^2$/g), thereby increasing photocatalytic degradation efficiency and the efficiency can reach 92%, besides, the invention has advantages of simple preparation technology, cheap raw materials and low preparation cost, so the invention is suitable for industrial production.

Some preferred embodiments of this invention are described. It should be understood that the present invention is not limited to above specific embodiments, other equipments and structures which are not described in detail herein should be understood as common mode of the art those skilled in the art can use above disclosed methods and technical content to make some possible variations, modifications, and equivalents to the technical proposal without departing from the scope of the present invention, and it will not affect substances of the present invention. So any simple variations, equivalents and modifications of above embodiments without departing from contents of the technical proposal based on the technical scheme of the present invention shall belong to protection scope of the present invention.

We claim:

1. A method of, preparing a photocatalytic concrete material by spraying a photocatalytic sizing agent on a concrete block, comprising:
   step 1: activating a nature zeolite molecular sieve to obtain an activated zeolite molecular sieve;
   step 2: preparing a titanium dioxide/activated zeolite composite with the activated zeolite molecular sieve, tetrabutyl titanate, anhydrous ethanol, acetic acid, and nitric acid;
   step 3: preparing a photocatalytic sizing agent with the titanium dioxide/activated zeolite composite; and
   step 4: preparing a photocatalytic concrete material with the photocatalytic sizing agent;
   wherein the step 3 further comprises
   dispersing the titanium dioxide/activated zeolite composite into water to form a suspension;
   adding a dispersant and an emulsifier into the suspension; and
   stirring and obtaining the photocatalytic sizing agent, wherein the dispersant is sodium dodecyl benzene sulfonate;
   wherein the step 4 of preparing the photocatalytic concrete material with the photocatalytic sizing agent comprises:
   spraying the prepared photocatalytic sizing agent on surface of a concrete block, drying in the air naturally and obtaining the photocatalytic concrete material; wherein the prepared photocatalytic sizing agent is sprayed on surface of the concrete block for 1 to 10 layers;
   wherein
   the step 1 further comprises:
   washing the natural zeolite molecular sieve with distilled water;
   placing the washed natural zeolite molecular sieve into an oven and drying the washed natural zeolite molecular sieve in the oven under a temperature of 70-90° C.;
   placing the dried natural zeolite molecular sieve into a high temperature furnace and calcining the dried natural zeolite;
   obtaining the activated zeolite molecular sieve;
   the step 2 further comprises:
   dissolving tetrabutyl titanate into anhydrous ethanol, stirring and forming a first mixture;
   adding the activated zeolite molecular sieve slowly into the first mixture, mixing for 20 minutes and obtaining a second mixture, wherein TiO$_2$ and the activated zeolite molecular sieve has a mass ratio of 1:0.5;
   adding acetic acid and nitric acid into the second mixture slowly to obtain a third mixture;
   mixing the third mixture for 10 minutes and adjusting the third mixture to a pH of 3, keep mixing for 1 hour and aging for 24 hours under a sealed condition to obtain a sol; and
   drying the sol for 12 hours in an oven of 90° C., calcining the dried sol for 2 hours at 500° C., grinding the calcined sol and obtaining the titanium dioxide/activated zeolite composite;
   in the step 3:
   the dispersant is sodium dodecyl benzene sulfonate;
   the emulsifier is alkyl aryl polyoxyethylene ester, wherein 0.2066 g of sodium dodecyl benzene sulfonate, and 0.15 g of the emulsifier are added for each 5 g of the titanium dioxide/activated zeolite composite; and
   in a production process of the concrete block in the step 4, a water cement ratio is 0.375, and a curing age is 3 days, and the prepared photocatalytic sizing agent is sprayed on surface of the concrete block for 10 layers, drying in the air naturally and obtaining the photocatalytic concrete material.

2. The method of claim 1, wherein the step 1 of preparing an activated zeolite molecular sieve with a natural zeolite molecular sieve comprises:
    washing the natural zeolite molecular sieve with distilled water;
    placing the washed natural zeolite molecular sieve into an oven and drying the washed natural zeolite molecular sieve; wherein the oven temperature is 70-90° C.; and
    placing the dried natural zeolite molecular sieve into a high temperature furnace and calcining the dried natural zeolite; and
    obtaining the activated zeolite molecular sieve.

3. The method of claim 1, wherein the step 2 preparing a titanium dioxide/activated zeolite composite with the activated zeolite molecular sieve, tetrabutyl titanate, anhydrous ethanol, acetic acid, and nitric acid comprises:
    dissolving tetrabutyl titanate into anhydrous ethanol, stirring for 10 minutes and forming a first mixture;
    adding the activated zeolite molecular sieve slowly into the first mixture, mixing evenly and obtaining a second mixture;
    adding acetic acid and nitric acid into the second mixture slowly and obtaining a sol; and
    drying, calcining, grinding the sol and obtaining the titanium dioxide/activated zeolite composite.

4. The method of claim 1, wherein the step 3 of preparing a photocatalytic sizing agent with the titanium dioxide/activated zeolite composite further comprises adding a silane coupling agent into the suspension;
    wherein the silane coupling agent is 3-aminopropyltriethoxysilane.

5. A photocatalytic concrete material prepared by spraying a photocatalytic sizing agent on a concrete block prepared according to claim 1, wherein the photocatalytic concrete material is prepared by following steps:
    step 1: preparing a natural zeolite molecular sieve into an activated zeolite molecular sieve;
    step 2: preparing the activated zeolite molecular sieve, tetrabutyl titanate, anhydrous ethanol, acetic acid, and nitric acid into a titanium dioxide/activated zeolite composite;
    step 3: preparing a photocatalytic sizing agent with the titanium dioxide/activated zeolite composite; and
    step 4: preparing a photocatalytic concrete material with the photocatalytic sizing agent;
    wherein the step 2 further comprises:
    dissolving tetrabutyl titanate into anhydrous ethanol, stirring and forming a first mixture;
    adding the activated zeolite molecular sieve slowly into the first mixture, mixing and obtaining a second mixture;
    adding acetic acid and nitric acid into the second mixture slowly and obtaining a sol; and
    drying, calcining, grinding the sol and obtaining the titanium dioxide/activated zeolite composite
    the step 3 further comprises dispersing the titanium dioxide/activated zeolite composite into water;
    adding a dispersant and an emulsifier;
    stirring and obtaining the photocatalytic sizing agent;
    the step 4 further comprises spraying the photocatalytic sizing agent on a surface of a concrete block; and
    a number of a photocatalytic sizing agent spraying layer is 1-10;
    wherein the photocatalytic concrete material is prepared by following materials in proportions by weight: the titanium dioxide/activated zeolite composite 5 g, the emulsifier 0.15 g, the dispersant 0.2066 g, a cement 800 g and a fine sand 900 g;
    wherein a weight ratio of a titanium dioxide to an activated zeolite sieve is 1:10; and
    the number of the photocatalytic sizing agent spraying layer is 10.

6. The photocatalytic concrete material prepared by spraying a photocatalytic sizing agent on a concrete block of claim 5, wherein
    a silane coupling agent is added;
    the dispersant is sodium dodecyl benzene sulfonate;
    wherein the silane coupling agent is 3-aminopropyltriethoxysilane.

* * * * *